Aug. 12, 1947. E. J. WITCHGER Re. 22,908

MEASURING TAPE

Original Filed Nov. 24, 1939

INVENTOR
EUGENE J. WITCHGER
BY George B. Willcox
ATTORNEY

Reissued Aug. 12, 1947

Re. 22,908

UNITED STATES PATENT OFFICE 22,908

MEASURING TAPE

Eugene J. Witchger, Saginaw, Mich., assignor to The Lufkin Rule Company, Saginaw, Mich., a corporation of Michigan Original No. 2,314,915, dated March 30, 1943, Serial No. 305,965, November 24, 1939. Application for reissue October 9, 1944, Serial No. 557,887

11 Claims. (Cl. 33—137)

This invention relates to measuring tapes made of ribbon metal, with printed graduations and electroplated background areas.

Speaking generally, a novel principle is involved in my discovery of underlying causes of poor legibility, and short life in earlier tapes of such character and in remedying the same.

It is concerned with process and structure features that bring about certain new and useful improvements in respect to legibility and attractive appearance of such tapes, lasting sharpness of the edges of the markings; better color and other visual qualities of the unmarked or background areas, and greater durability of the finished article.

These and certain other objects which will be set forth in the specifications have been attained not precisely by the improvement of any specific element or step, but by a novel reorganization and co-operative working of several known steps in unobvious sequence or order. The results thus produced have not heretofore been suggested or disclosed so far as I am aware.

The inventive novelty involved in various aspects of my improvement will be more particularly pointed out in the following detailed description and defined in the claims.

Figure 5:
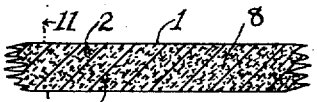
Fig. 5 shows an alternative embodiment wherein a mat-surfaced strip, Fig. 1, has been rust-proofed and the rust-proofed coating has been treated preparatory to receiving a coating of metal.
Figure 5A:
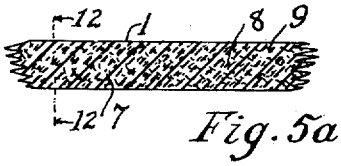
Figure 6:
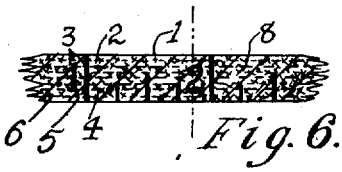

Fig. 5*a* shows a further modification wherein the mat surface has been created by the rust-proofing operation itself, and then treated, as in Fig. 5, to prepare for electroplating;

Fig. 6 shows the rust-proofed strip, Figs. 5 or 5*a*, with printed markings and plated background areas, this being a preferred structure and method for quantity production of high grade measuring tapes;

Figs. 7 to 13, inclusive, are enlarged and distorted cross-sectional views of the pieces shown in the respective adjacent Figs. 1 to 6, the sections being taken at place indicated by broken lines.

In the following description of my invention reference will be made to performing various process steps on the "surface" of a strip of metal. It will be understood, however, that the terms "surface" and "face" as applied to the base ribbon metal strip are intended to designate all or any part of the surface areas of the strip, because I employ the invention in the manufacture of tapes that are coated on one face only, on part of a face, or on all surfaces.

Solely for convenience in terminology and not intended to be construed in a limiting sense, I shall designate certain surfaces as being "punctulate," "pitted" or "mat-like," meaning that such a surface comprises a multitude of uniformly distributed unevennesses, punctures, points, dots, or pits 2 of microscopic dimensions. The operation that produces the surface will be called "pitting."

The term "markings" designates graduation marks, figures, letters, or other characters on the tape. The term "printing," "inking," "marking" are intended to embrace any suitable or usual way of applying figures and graduations to the tape, and more particularly figures and graduations printed in ink or the like that remain unplated when the remainder of the surface is plated. The unmarked areas are referred to as "background."

I shall now explain my new process and the novel physical features of the product, incidentally pointing out their advantages over earlier practice, because correct appreciation of the novelty and advantages in use of my new tape measure and the process for its manufacture requires a brief exposition of disadvantages inherent in earlier tapes.

Considered each by itself the various facts underlying the recited operations have long been known, yet, so far as I am aware, they have not been brought together in such a way as to produce measuring tapes that possess the commercial and practical advantages attained by this invention.

In manufacturing a tape according to my method I provide a smooth metal ribbon with a pitted or punctulate surface, mat-like in character, for I have discovered that the ribbon metal when pitted will impart to the finished measuring tape several qualities hitherto unforeseen, adding to its value, usefulness and durability.

Figure 1:
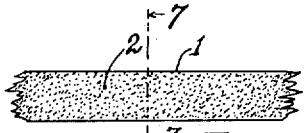
Fig. 1 illustrates schematically a strip of polished ribbon metal after having been given a punctulate or pitted surface of mat-like texture whereby improved physical and optical characteristics are imparted to the final outer surface of the finished product.
Figure 7:
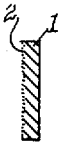

As a first step of my process therefore the customary polished commercial metal ribbon 1, Figs. 1 and 7, may be subjected to a treatment that gives its surface the desirable punctulate or pitted quality. Such treatment may comprise, for example, sand blasting, or spraying metal on the ribbon; or, preferably, subjecting the ribbon to mild etching by immersing it in approximately a ten per cent solution of nitric acid for about fifty or sixty seconds, then cleaning the resulting pitted surface 2 by washing.

When the market shall offer a commercial ribbon metal with surfaces already "pitted," as distinguished from the burnished and minutely scored surfaces now commonly available, then it will no longer be necessary to perform a pitting operation as an initial step in the manufacture of tapes according to my process.

At this point it may be explained that what I have just referred to as "mild etching" is quite different from the deep etching heretofore employed in the manufacture of tapes wherein maskings were applied directly to the face of a ribbon and the residual areas or backgrounds were then etched to a depth that made the markings stand out in relief. Deeply etched tapes proved unsatisfactory in use, for they soon lost the contrasty effect essential for easy reading. The mild etching or pitting operations used by me give a velvet-like mat, 2, without creating surfaces in relief.

Figure 2:
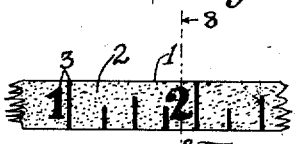
Fig. 2 shows the strip, Fig. 1, after having been marked with numerals and graduation characters.
Figure 8:
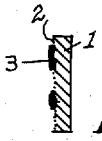

The second step, Figs. 2 and 8, is to apply conventional markings, 3, to the pitted surface 2, using any ink or equivalent substance that will not be damaged by solutions commonly used in electroplating. The ink is then hardened rapidly at appropriate temperature, say, about 270 degrees Fahrenheit, or, if preferred, more slowly at room temperature.

Some earlier tapes have been objectionable in that the marking substance, being printed directly upon a polished or burnished metal surface, eventually blistered and flaked off.

Preparing the ribbon surface by "pitting" imparts unusually tenacious holding power or "tooth" for the ink substance. The markings become deeply and evenly incorporated as a permanent part of the ribbon. They will not scale off or flake and can not be worn away under conditions of use to such an extent as to destroy or even materially reduce the legibility of the tape. Even perisistent scraping with a sharp tool will not destroy such markings, but leaves the tape measure in usable condition.

Figure 3:
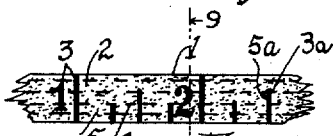
Fig. 3 shows the strip, Fig. 2, after its background areas have been plated with nickel or equivalent coating.
Figure 9:
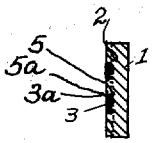
Figure 10:
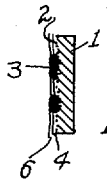
Figure 11:
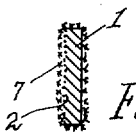
Figure 12:
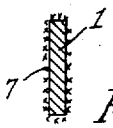
Figure 13:
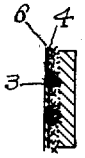

The third step, Figs. 3 and 9, is to electroplate those background portions 4 of the pitted surface 2 which are not covered by the markings 3; depositing thereon a light colored metal 5 such as nickel or silver. Electroplating does not "take" at all on the printed markings 3, but the exposed pitted or mat-like surfaces 2 take the plated metal 5 so deeply and bond it so securely that the plate will not crack or craze when the tape is flexed, twisted or buckled in use.

The fourth step, Figs. 4 and 10, is to again electroplate the background areas 4 with chromium or equivalent hard metal 6, imparting additional strength, durability, and hardness to the tape face and thereby preventing injury in use by scratching, rubbing, or impacts. Although this fourth step, chrome plating as a second coat, is preferable, it is optional for some classes of tape measures where extreme surface hardness is not a matter of great importance.

Having pointed out the great holding power of a pitted ribbon surface for the ink or marking substance, and its deep powerful bond for the plated metal on the background areas, I shall now describe an important additional and collateral advantage of providing a pitted ribbon surface beneath those places where marginal edges of the markings meet the marginal edges of the plating.

In earlier tapes with polished surfaces where margins of printed markings met edge to edge with the markins of a metal coating, flexing of the tape would eventually cause the meeting edges to separate far enough to let moisture get to the ribbon itself. Corrosion of the underlying metal started and soon one or both of the meeting edges would become undermined and eventually gave way, the result being that the graduations lost their sharp outlines and became fuzzy, blurred, and less easy to read.

The pitted surface, 2, Fig. 9, is helpful in preventing such defects because it bonds so thoroughly with the ink markings 3 at their very edges 3*a*, and likewise with the edges 5*a* of the electroplated coating 5, that separation of the meeting edges of ink 3 and plating 5 is less liable to occur than in the earlier tapes alluded to.

Attainment of better optical characteristics has long been a baffing problem to manufacturers of measuring tapes, rules and the like, but I have discovered that which seems to have escaped the research of persons skilled in the art to which this invention pertains, namely, that high metallic mirror-like reflectiveness from the finished background surfaces of a measuring tape, heretofore deemed an advantage, is in fact a detriment, as will be understood from the following:

When a metal ribbon with burnished or polished surfaces is printed with graduation markings 3 and is laid on a table and viewed from a short distance away and from different angles relatively to a light source, its unprinted areas act like mirrors. The tape appears shiny, brilliant, or glary from some view points and duller and darker from others according to the nature of the image which the unprinted areas may happen to reflect. Dark images present inadequate contrast with the markings, giving the tape poor legibility. Bright images cause glare that makes the tape difficult to read. The reflected surroundings sometimes produce undesirable variant light-and-dark effects at different places along the tape surface.

Such undesirable optical effects are probably due, at least in part, to the fact that the polished or burnished surface of commercial metal ribbon has a multitude of minute parallel hair-like lines or scores created in the final cold rolling of the ribbon. The scores, close together and extending lengthwise, cause the ribbon surface to reflect light differently when viewed sidewise than when viewed lengthwise.

Even after the ribbon has been electroplated, the same aberrations from light to dark with glare and poor legibility characterized the surface of the finished tape.

I have discovered a way of correcting such reflective defects, namely, by providing the ribbon with the previously described punctulate or pitted surface of mat-like texture.

The pitted surface on the ribbon imparts to the finish coating of the tape certain desirable characteristics not heretofore obtainable to such extent, if at all. For example, a first coating of metal, 5, plated on the pitted surface will display a non-glary mat-like finish, and a second coating of harder metal 6, Fig. 4, plated over its surface will be free from harmful glare. For another example, I apply to the ribbon a single relatively thick plating of hard metal, in which event no further plating will be required to produce the desired results. However, nickel used as a first or filler coat is somewhat less expensive and is entirely suitable. In either event the thickness of the plated coating, or coatings, is preferably equal in thickness to, or slightly thicker than, the thickness of the ink or other coating used to provide the graduation markings. This insures that the outer hard plated coating which is much more wear resistant than the ink on the graduation markings serves to protect the graduations from being rubbed off when the tape is in use.

Although surface reflectiveness is an important matter in metal tape measure production, there is another feature of almost equal importance which influences sales, and that is color or shade of the background. I have found that a minutely pitted surface 2 on the original ribbon 1 gives to the final chrome coating 6, Fig. 4, an unusual and very attractive bluish-white color which gives effective contrast with dark colored markings 3 and makes the tape measure more easily readable in dim lighting.

A fifth and final step, also optional, is to coat the tape with transparent lacquer.

A modification of the method set forth in the above five steps has to do with rust-proofing the pitted or punctulate ribbon surface, as is indicated at 7, Figs. 5, 5*a*, 6, before the steps of marking and plating are performed.

This rust-proofing step contributes important advantages and does not add unduly to the cost of manufacturing high grade measuring tapes and I consider it a preferable feature.

Rust-proofing may be accomplished by a known process bearing the trade names "Parkerizing" and "Bonderizing." It comprises immersing the ribbon 1 in a heated solution that reacts on the metal surface, changing it to a phosphate coating 7 insoluble in water and resistant to corrosion.

After having been rust-proofed and printed, the unprinted portions of the surface present crystals or particles of phosphate that would tend to interfere with subsequent electroplating, causing it to craze, crack, or flake when bent and therefore experts have deemed it to be commercially impracticable to attempt to electroplate upon rust-proofed flexible ribbon measuring tapes. So, prior to my present invention tape measures with electroplated background areas were deprived of the benefits of rust-proofing underneath the plate.

I have discovered a simple way of treating rust-proofed surfaces so they will take electroplating perfectly and hold it permanently.

The treatment is in general described and claimed in my abandoned application, Serial No. 305,966, filed November 24, 1939 and copending with the original application for the present invention. A portion only of the adherent phosphate is removed from the phosphated surfaces, or at least from those areas which are to be electroplated. Removal may be by scrubbing with water, or with a dilute solution of muriatic acid. Thus treated, the resultant rust-proofed surfaces 8, Figs. 5, 5*a*, 6, have a mat-like texture very like the pitted base surfaces 2, Figs. 1 and 7, which were produced by etching alone. The additional steps, marking, nickel-plating, and, if desired, chromeplating, may then be performed in any appropriate sequence.

Figure 4:
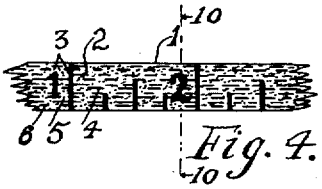
Fig. 4 shows the strip, Fig. 3, after having been provided with a coating of harder metal over the first plating.

This preferred modified method, rust-proofing a mat or pitted surface and then removing a portion only of the surplus rust-proofing material, produces good optical results in the finished tape measure, giving the final chromium coat 6, Figs. 4 and 6, a non-glary mat-like surface contrast, and the attractive bluish-white or silvery-white color which has been alluded to. It is resistant to corrosion and wear, and insures permanent sharpness of the meeting edges of the graduation markings and background plating.

A still further modification of my invention may comprise combining rust-proofing and pitting in a single operation. I now draw attention to this simplification of my invention, indicated schematically in Figs. 5*a* and 13.

Although better results are derived if pitting and rust-proofing are attained as separate steps in the manner already set forth, I have found that the rust-proofing operation alone will pit the surface of a commercial ribbon metal sufficiently to attain the major portion of the advantages recited.

The ribbon having been rust-proofed, markings are then applied on the rust-proof coating, after which the outer surface portion of the coating of phosphate material is removed from the unprinted background areas in the manner already described, and finally the thinned rust-proofed surface 9 is plated as in the preceding example.

The phosphatic coating which results from the rust-proofing instead of having the hard, naturally repellent and impervious surface properties of the metal provides a surface which exhibits marked properties of porosity and absorbency to which protective coatings such as paints, lacquers or the like are remarkably adherent.

While these adherent properties and advantages of rust-proofed surfaces indicated the use of rust-proofing for electroplated articles, the art after much experimentation found that metals which could otherwise be plated successfully could not be uniformly or satisfactorily electroplated after being rust-proofed. Hence it has generally been believed that in spite of its desirability, rust-proofing could not be used where it was necessary or desirable to electroplate the surface of the metal, the difficulty experienced in attempting to electroplate rust-proofed metals being due to the insulating or at least poorly electroconductivity of the phosphatic coating on the exposed surfaces of the metal resulting from the rust-proofing treatment. Consequently, although the desirability of using rust-proofed metal for measuring tapes has long been recognized, as it has long been standard practice to electroplate the better quality metal tapes, it has been considered impossible to use rust-proofed metal in their construction.

I have found that in addition to the expected advantages from employing a rust-proofed base metal with its desirable anti-rusting properties, new, unexpected and exceptional results have been attained in the art of constructing metallic tape measures as follows:

(*a*) Due to the much greater porosity of the rust-proofed metal over the untreated metallic ribbon stock, the printed ink markings are bonded so securely to the metal that they cannot be removed or impaired except by grinding or scraping below the surface of the metal to which they are affixed;

(b) The electroplated coatings are much more intimately and firmly united to the background or unmarked areas of the tape and will resist crazing, cracking or peeling to a much greater extent than electroplated, non-rust-proofed tapes.

(c) Separation of the margins or meeting edges of the printed and electroplated areas as a result of flexing of the tape has been entirely eliminated, and (d) As the surface resulting from the rust-proofing is a dark minutely punctulate one of mat-like texture the objectionable surface reflections of the polished ribbon tapes has been completely overcome.

It has heretofore been thought highly desirable to provide highly polished surfaces on metal tape measures because the highly polished metal tape makes a very attractive appearing article having marked customer appeal and also the highly polished tape would tend to reduce undesirable friction effects in coiling the tape within its casing, and furthermore for the purpose of facilitating cleaning the tape. I have discovered, however, that which seems to have escaped the attention of those skilled in the art to which this invention appertains, namely, that instead of the highly polished tape being a desirable feature, it is highly undesirable.

I have also discovered that by producing the minutely pitted punctulated surfaces, the erratic optical effects hereinbefore referred to can be entirely obviated and thereby a tape of much greater legibility be procured but with entirely unexpected results from the standpoint of markedly increased durability or longevity, while also producing an article of even greater attractiveness in appearance than the polished tapes of the prior art.

Having thus described my invention, what I claim and desire to secure by Letters Patent is:

1. A tape measure comprising a flexible strip of ribbon metal having at least one face thereof provided with a mat-like minutely punctulated area, portions of said area having a coating penetrating into the punctules thereof and a contrasting coating of rust resistant metal abutting said first mentioned coating and covering the entire remaining portions of said area, said metal coating providing a substantially glare free, light diffusing surface, one of said coatings constituting markings including graduation markings and the other coating constituting a background area for said markings.

2. A tape measure comprising a flexible strip of ribbon metal having a portion of at least one face thereof provided with markings including graduation markings and another portion of said face provided with a contrasting coating of rust resistant metal abutting said markings and forming a substantially glare free light diffusing background for said markings, said strip having a mat-like minutely punctulated area extending continuously under said markings and coating, said markings and coating covering all portions of said punctulated area and being securely bonded thereto.

3. A measuring tap comprising a strip of thin flexible ribbon metal having at least one face thereof covered with minute pits to form an area with substantially glare free light diffusing characteristics, a portion of said area being provided with coated markings including graduation markings extending into said pits and being thereby securely bonded to said strip and the entire remaining portion of said area being provided with an electroplated coating of a rust resistant metal intimately united to, and bonded with, said strip and being of a thickness substantially equal to the thickness of the coating forming said markings.

4. A measuring tape comprising a strip of thin flexible ribbon metal having all portions of at least one face thereof provided with a rust-proof coating to form a minutely pitted area having substantially glare free light diffusing characteristics, a minor portion of said area having superimposed thereon coated markings including graduation markings penetrating into said pits and being thereby securely bonded to said rust-proof coating, and the entire major remaining portion of said area having superimposed thereon an electroplated coating of a rust resistant metal intimately united to, and bonded with, said rust-proof coating.

5. A measuring tape comprising a strip of thin flexible ribbon metal having at least one face thereof provided with a rust-proof coating to form a minutely pitted area having substantially glare free light diffusing characteristics, a minor portion of said area having superimposed thereon coated markings including graduation markings penetrating into said pits and being thereby securely bonded to said rust-proof coating, and the entire major remaining portion of said area having superimposed thereon an electrolytic coating of rust resistant metal bonded to said rust-proof coating and a second coating of harder rust resistant metal superimposed upon, and bonded to, said last named metal.

6. A steel measuring tape comprising a foundation member in the form of a flexible ribbon-like strip of metal having at least one face thereof provided with a rust resistant coating of greater porosity and absorbency than naturally possessed by such metal and forming a minutely pitted area on said metal, a plurality of spaced coated markings including graduation markings superimposed upon and intimately united with said rust resistant coating and covering a portion only of the area of said rust resistant coating and an electroplated coating of rust resistant metal superimposed upon, and bonded to, the entire remaining area of said rust resistant coating and cooperating with said markings to provide a tape of substantially uniform thickness throughout its entire width and length.

7. A measuring tape comprising a base strip of thin ribbon metal having all portions of at least one face thereof treated to provide a glare free area, mat-like in texture, formed of a multitude of minute pits uniformly distributed over said entire area whereby said strip throughout its entire length and width will be of substantially uniform thickness in all parts thereof, the minor portion of said area being provided with a non-metallic coating consisting of a plurality of spaced markings including graduation markings and indicia superimposed upon said background and penetrating the same substantially to the full depth of said pits and the remaining portion of said area being provided with an electrolytic coating of a rust resistant and wear resistant metal intimately united with, and bonded to said strip and forming a glare free contrasting surface for said markings, said electrolytic coating being of substantially the same thickness as said non-metallic coating to shield the latter from frictional wearing contact and forming a tightly adherent joint with the markings provided by said non-metallic coating around all of the meeting edges of said non-metallic and metallic coatings.

8. A measuring device comprising a metallic strip a surface of which is provided with an indicia area and a background area, the surface of one of said areas being colored, the other area of the metallic strip having a matte surface and an outer coating of metal on the said last named surface and which has assumed the matte characteristics of the underlying matte surface.

9. A measuring device comprising a metallic strip a surface of which is provided with an indicia area and a background area, colored reaction products of a metal disposed upon one of said areas, the other area of the metallic strip having a matte surface and an outer coating of metal on the said last named surface and which has assumed the matte characteristics of the underlying matte surface.

10. A measuring device comprising a metallic strip a surface of which is provided with indicia areas and background areas, the surface of the indicia areas being colored, the background areas of the metallic strip having a matte surface and an outer coating of metal thereon which has assumed the matte characteristics of the underlying matte surface and provides legible contrast with said colored indicia areas.

11. A measuring device comprising a metallic strip a surface of which is provided with indicia areas and background areas, colored reaction products of a metal disposed on said indicia areas, the background areas of the metallic strip having a matte surface and an outer coating of metal thereon which has assumed the matte characteristics of said underlying matte surface and provides legible contrast with said colored indicia areas.

EUGENE J. WITCHGER.